(12) United States Patent
Yang

(10) Patent No.: US 12,118,609 B2
(45) Date of Patent: Oct. 15, 2024

(54) METHOD, SYSTEM AND NON-TRANSITORY COMPUTER-READABLE RECORDING MEDIUM PROVIDING OPEN METAVERSE SERVICE INTERWORKING WITH A PLURALITY OF METAVERSE PLATFORMS

(71) Applicant: REDBRICK INC., Seoul (KR)

(72) Inventor: Yeongmo Yang, Seoul (KR)

(73) Assignee: REDBRICK INC., Seoul (KR)

( * ) Notice: Subject to any disclaimer, the term of this patent is extended or adjusted under 35 U.S.C. 154(b) by 0 days.

(21) Appl. No.: 18/493,499

(22) Filed: Oct. 24, 2023

(65) Prior Publication Data
US 2024/0135437 A1   Apr. 25, 2024
US 2024/0233000 A9   Jul. 11, 2024

(30) Foreign Application Priority Data

Oct. 24, 2022   (KR) .................. 10-2022-0137826

(51) Int. Cl.
*G06Q 30/015*   (2023.01)
*G06Q 20/12*    (2012.01)
*G06Q 20/38*    (2012.01)
*G06Q 30/0601*  (2023.01)

(52) U.S. Cl.
CPC ..... *G06Q 30/0643* (2013.01); *G06Q 20/1235* (2013.01); *G06Q 20/382* (2013.01)

(58) Field of Classification Search
None
See application file for complete search history.

(56) References Cited

U.S. PATENT DOCUMENTS

| 7,870,074 B2 * | 1/2011 | Amsterdam | A63F 13/352 |
| | | | 705/51 |
| 9,338,200 B2 * | 5/2016 | Park | A63F 13/79 |
| 2010/0161439 A1 * | 6/2010 | Hamilton, II | A63F 13/30 |
| | | | 705/26.1 |
| 2011/0014985 A1 * | 1/2011 | Park | A63F 13/60 |
| | | | 463/43 |
| 2023/0201725 A1 * | 6/2023 | Dalmia | G06Q 20/385 |
| | | | 463/40 |
| 2023/0241514 A1 * | 8/2023 | Dalmia | A63F 13/69 |
| | | | 463/40 |
| 2023/0291740 A1 * | 9/2023 | Ashby | G06Q 30/015 |

FOREIGN PATENT DOCUMENTS

| KR | 10-2011-0007419 A1 | 1/2011 |
| KR | 10-2418062 B1 | 7/2022 |
| KR | 10-2450175 B1 | 10/2022 |

* cited by examiner

*Primary Examiner* — Sunit Pandya
(74) *Attorney, Agent, or Firm* — Dinsmore & Shohl LLP; Yongsok Choi, Esq.

(57) ABSTRACT

A method for providing an open metaverse service interworking with a plurality of metaverse platforms is provided. The method includes the steps of: acquiring a content interworking with at least one metaverse platform; and supporting a transaction for the acquired content in a marketplace interworking with the at least one metaverse platform.

5 Claims, 2 Drawing Sheets

METHOD, SYSTEM AND NON-TRANSITORY COMPUTER-READABLE RECORDING MEDIUM PROVIDING OPEN METAVERSE SERVICE INTERWORKING WITH A PLURALITY OF METAVERSE PLATFORMS

CROSS-REFERENCE TO RELATED APPLICATION(S)

This application claims priority to Korean Patent Application No. 10-2022-0137826 filed on Oct. 24, 2022, the entire contents of which are hereby incorporated by reference.

FIELD OF THE INVENTION

The present invention relates to a method, system, and non-transitory computer-readable recording medium for providing an open metaverse service interworking with a plurality of metaverse platforms.

BACKGROUND

The recent pandemic environment caused by the coronavirus has curtailed activities and interactions in the real world, so that people's thirst and desire for connections and relationships have led them to enter and engage in a virtual world or metaverse.

The concept of the metaverse, the technology for implementing the metaverse, and the goods and services actually experienced or used through the metaverse have existed before. However, the metaverse is rapidly expanding into all industries such as marketing, concerts, and healthcare after the pandemic, and the importance of the metaverse as a hyper-connected and hyper-realistic digital world is expected to further increase in human life.

Meanwhile, most of the existing metaverse platforms are closed metaverse platforms operated by a few companies, and there are criticisms that it is not possible to experience all parts of the metaverse world in one metaverse platform if it is operated as a closed metaverse system.

However, with the advent of the Web 3.0 era where users own and manage assets based on a blockchain, there are active discussions to build an open metaverse ecosystem.

In this connection, the inventor(s) present a technique for acquiring a content interworking with at least one metaverse platform, and supporting a transaction for the acquired content in a marketplace interworking with the at least one metaverse platform.

SUMMARY OF THE INVENTION

One object of the present invention is to solve all the above-described problems in the prior art.

Another object of the invention is to enhance connectivity and scalability between a plurality of metaverse platforms by causing an acquired content to interwork with the plurality of metaverse platforms.

Yet another object of the invention is to provide a user interface (UI) or user experience (UX) for supporting content creation, so that the content creation may become more accessible to open metaverse service users.

Still another object of the invention is to implement a decentralized token economy by causing revenue to be generated for users with reference to rewards for content transactions.

The representative configurations of the invention to achieve the above objects are described below.

According to one aspect of the invention, there is provided a method for providing an open metaverse service interworking with a plurality of metaverse platforms, the method comprising the steps of: acquiring a content interworking with at least one metaverse platform; and supporting a transaction for the acquired content in a marketplace interworking with the at least one metaverse platform.

According to another aspect of the invention, there is provided a system for providing an open metaverse service interworking with a plurality of metaverse platforms, the system comprising: a content acquisition unit configured to acquire a content interworking with at least one metaverse platform; and a content management unit configured to support a transaction for the acquired content in a marketplace interworking with the at least one metaverse platform.

In addition, there are further provided other methods and systems to implement the invention, as well as non-transitory computer-readable recording media having stored thereon computer programs for executing the methods.

According to the invention, it is possible to enhance connectivity and scalability between a plurality of metaverse platforms by causing an acquired content to interwork with the plurality of metaverse platforms.

According to the invention, it is possible to provide a user interface (UI) or user experience (UX) for supporting content creation, so that the content creation may become more accessible to open metaverse service users.

According to the invention, it is possible to implement a decentralized token economy by causing revenue to be generated for users with reference to rewards for content transactions.

DETAILED DESCRIPTION OF THE INVENTION

Figure 1:
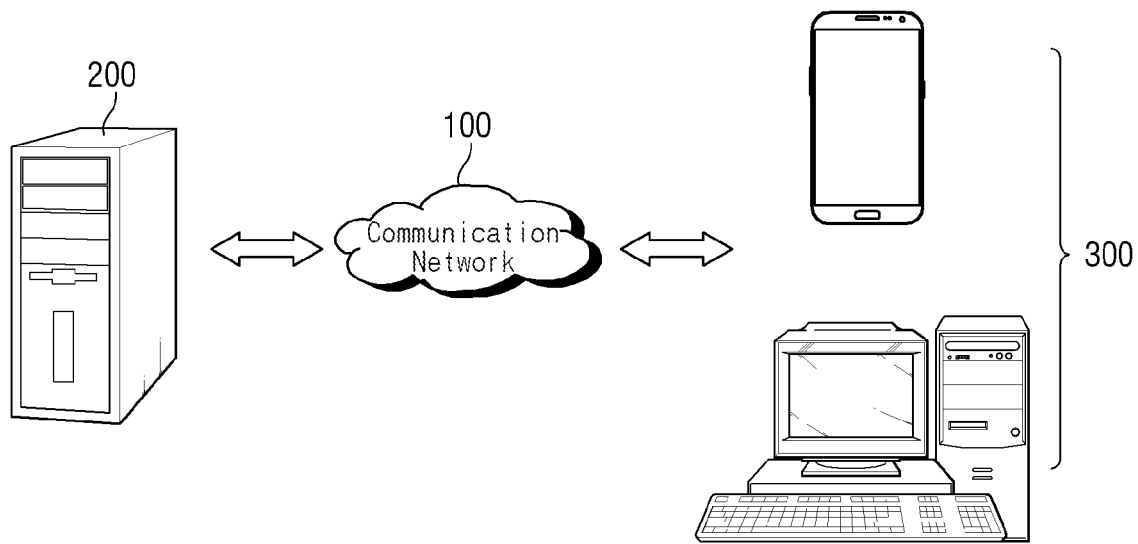
FIG. 1 schematically shows the configuration of an entire system for providing an open metaverse service interworking with a plurality of metaverse platforms according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

The term "content" or "contents" as used herein encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Further, the term "metaverse" as used herein is a combination of the word "meta" meaning transcendence that unites reality and virtuality, and the word "verse" meaning a world, and may refer to a 3D-based virtual world in which a person conducts daily or economic activities through an avatar representing himself/herself in real life. The metaverse platform according to one embodiment of the invention is not limited to technical fields such as gaming, business, and video chatting, and may include Minecraft, Roblox, Naver's Geppetto, Fortnite, Nvidia's Enterprise, Facebook's Horizon, Google's Starline, and the like.

Furthermore, the term "avatar" as used herein is a character generated to conduct daily or economic activities in a virtual world on behalf of a user himself/herself, and may be represented by a two-dimensional or three-dimensional graphical object.

Hereinafter, various preferred embodiments of the invention will be described in detail with reference to the accompanying drawings to enable those skilled in the art to easily implement the invention.

Configuration of the Entire System

FIG. 1 schematically shows the configuration of the entire system for providing an open metaverse service interworking with a plurality of metaverse platforms according to one embodiment of the invention.

As shown in FIG. 1, the entire system according to one embodiment of the invention may comprise a communication network 100, a service provision system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the service provision system 200 according to one embodiment of the invention may function to acquire a content interworking with at least one metaverse platform, and support a transaction for the acquired content in a marketplace interworking with the at least one metaverse platform.

The configuration and functions of the service provision system 200 according to the invention will be discussed in more detail below.

Next, the device 300 according to one embodiment of the invention is digital equipment capable of connecting to and then communicating with the service provision system 200, and any type of digital equipment having a memory means and a microprocessor for computing capabilities, such as smart phones, tablets, smart watches, smart bands, smart glasses, desktop computers, notebook computers, workstations, personal digital assistants (PDAs), web pads, and mobile phones, may be adopted as the device 300 according to the invention.

In particular, the device 300 may include an application (not shown) for assisting a user to receive services according to the invention from the service provision system 200. The application may be downloaded from the service provision system 200 or an external application distribution server (not shown). Meanwhile, the characteristics of the application may be generally similar to those of a content acquisition unit 210, a content management unit 220, a communication unit 230, and a control unit 240 of the service provision system 200 to be described below. Here, at least a part of the application may be replaced with a hardware device or a firmware device that may perform a substantially equal or equivalent function, as necessary.

Configuration of the Service Provision System

Hereinafter, the internal configuration of the service provision system 200 200 crucial for implementing the invention and the functions of the respective components thereof will be discussed.

Figure 2:
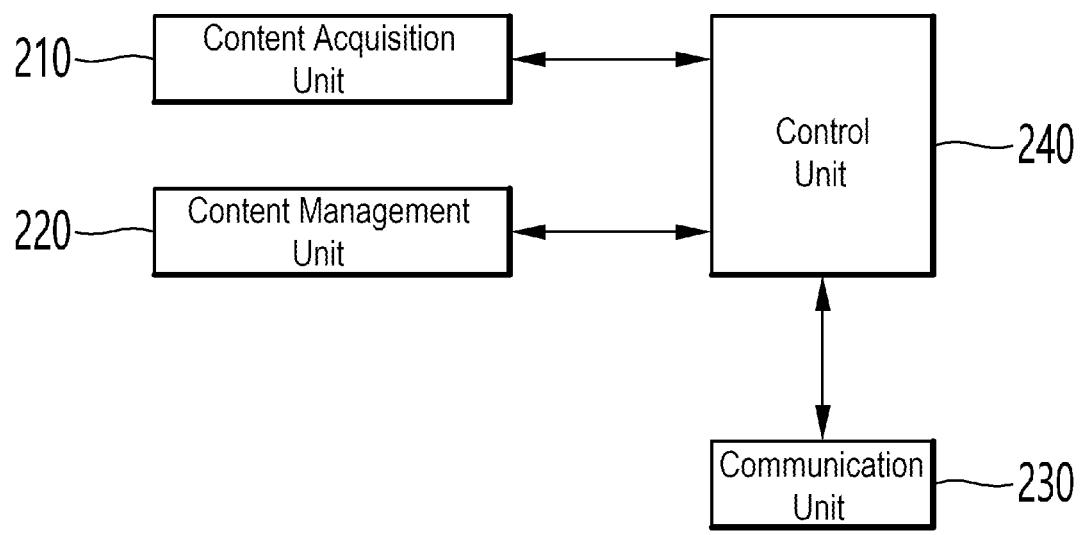
FIG. 2 specifically shows the internal configuration of a service provision system according to one embodiment of the invention.

FIG. 2 specifically shows the internal configuration of the service provision system 200 according to one embodiment of the invention.

As shown in FIG. 2, the service provision system 200 according to one embodiment of the invention may comprise a content acquisition unit 210, a content management unit 220, a communication unit 230, and a control unit 240. According to one embodiment of the invention, at least some of the content acquisition unit 210, the content management unit 220, the communication unit 230, and the control unit 240 may be program modules to communicate with an external system (not shown). The program modules may be included in the service provision system 200 in the form of operating systems, application program modules, and other program modules, while they may be physically stored in a variety of commonly known storage devices. Further, the program modules may also be stored in a remote storage device that may communicate with the service provision system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the service provision system 200 has been described as above, and it will be apparent to those skilled in the art that at least a part of the components or functions of the service provision system 200 may be implemented in the device 300 or a server (not shown) or included in an external system (not shown), as necessary.

First, the content acquisition unit 210 according to one embodiment of the invention may acquire a content interworking with at least one metaverse platform.

The content interworking with the at least one metaverse platform according to one embodiment of the invention may comprise data such as text, image, video, audio, and links (e.g., web links) or a combination of at least two types of such data, and may refer to, for example, an avatar, a game, a program (e.g., a UGC, a premium NFT production method, a guide to revenue generation, or a creative educational material), or a creative work (e.g., architecture, design, product, fashion, or character) associated with the metaverse platform.

Meanwhile, the content acquisition unit 210 according to one embodiment of the invention may acquire a content generated through a user interface (UI) or user experience (UX) provided by the service provision system 200.

Specifically, the service provision system 200 according to one embodiment of the invention may provide a user interface or user experience for supporting content creation, and the content interworking with the at least one metaverse platform may be generated through the user interface or user experience.

More specifically, the user interface or user experience according to one embodiment of the invention is intended to support content creation, and the content interworking with the metaverse platform may be generated or produced using various modules (e.g., modules related to 3D models, 3D assets, video, text, web, voice, UI elements, block coding, and text coding) and various contents (e.g., contents associated with commerce, education, global IP, entertainment, gaming, and sports) provided via the user interface or user experience.

In this way, a user interface or user experience for supporting content creation according to one embodiment of the invention may be provided so that the content creation may become more accessible to open metaverse service users.

Next, the content management unit 220 according to one embodiment of the invention may support the acquired content to interwork with a plurality of metaverse platforms.

Specifically, the content acquisition unit 210 according to one embodiment of the invention may acquire a first content interworking with a first metaverse platform, and the content management unit 220 according to one embodiment of the invention may generate a second content interworking with a second metaverse platform with reference to the acquired first content. More specifically, according to one embodiment of the invention, at least a part of a first user experience (UX) for the first content interworking with the first metaverse platform may correspond to at least a part of a second user experience (UX) for the second content interworking with the second metaverse platform.

For example, when data on a first avatar generated on the first metaverse platform is acquired, the content management unit 220 according to one embodiment of the invention may generate data on a second avatar corresponding to the first avatar on the second metaverse platform, with reference to the acquired data on the first avatar. Then, according to one embodiment of the invention, a first user experience based on the data on the first avatar (e.g., an appearance, shape, clothing, behavior, and nickname of the first avatar) on the first metaverse platform may correspond to a second user experience based on the data on the second avatar on the second metaverse platform in a one-to-one manner.

Continuing with the example, when data on a first game generated on the first metaverse platform is acquired, the content management unit 220 according to one embodiment of the invention may generate data on a second game corresponding to the first game on the second metaverse platform, with reference to the acquired data on the first game. Then, according to one embodiment of the invention, an open metaverse service user may participate in the second game on the second metaverse platform, using the second avatar corresponding to the first avatar interworking with the first metaverse platform, without any separate operation (e.g., login of the user into a website or mobile application). Here, according to one embodiment of the invention, when the data on the first avatar and the first game are updated on the first metaverse platform, the data on the second avatar and the second game may be updated on the second metaverse platform in real time.

As another example, when data on a third avatar generated on a third metaverse platform is acquired, the content management unit 220 according to one embodiment of the invention may generate data on a fourth avatar corresponding to the third avatar on a fourth metaverse platform, with reference to the acquired data on the third avatar. Then, according to one embodiment of the invention, as a third user experience based on the data on the third avatar (e.g., the third avatar in the form of a three-dimensional graphical object) on the third metaverse platform interworks with specifications supported by the fourth metaverse platform (e.g., an avatar in the form of a two-dimensional graphical object is supported by the fourth metaverse platform), at least a part of a fourth user experience based on the data on the fourth avatar (e.g., the fourth avatar corresponding to the third avatar made into a two-dimensional graphical object) on the fourth metaverse platform may correspond to at least a part of the third user experience.

In this way, connectivity and scalability between a plurality of metaverse platforms may be enhanced by causing a content acquired according to one embodiment of the invention to interwork with the plurality of metaverse platforms.

Further, the content management unit 220 according to one embodiment of the invention may support a transaction for the acquired content in a marketplace interworking with the at least one metaverse platform.

The marketplace interworking with the at least one metaverse platform according to one embodiment of the invention is a virtual space that enables transactions for contents of open metaverse service users on the basis of a payment system of a financial company and a NFT payment system based on Web 3.0, and may interwork with a bank (or wallets or accounts) for managing deposits, withdrawals, and payment history of the open metaverse service users.

Specifically, the content management unit 220 according to one embodiment of the invention may support issuance of a non-fungible token (NFT) for the acquired content.

For example, the content management unit 220 according to one embodiment of the invention may proceed with NFT minting for the acquired content (e.g., architecture, space, product, fashion, character, avatar, or game) in response to collecting fees from the wallets of the open metaverse service users.

Further, the content management unit 220 according to one embodiment of the invention may support the acquired content to interwork with a plurality of metaverse platforms on the basis of a transaction for the issued NFT.

For example, the content management unit 220 according to one embodiment of the invention may cause data on the acquired content to be exported to the plurality of metaverse platforms and uploaded to applications as well as the web, through the transaction for the NFT.

Meanwhile, the content management unit 220 according to one embodiment of the invention may determine a reward for the transaction for the acquired content.

For example, the content management unit 220 according to one embodiment of the invention may provide information on an NFT asset value analyzed with reference to various data (e.g., propensity of the open metaverse service users, NFT transaction status, and market trends) in the marketplace, in order to support transactions of the open metaverse service users. Then, the content management unit 220 according to one embodiment of the invention may determine a reward for the transaction for the content with reference to the information on the NFT asset value.

Further, the content management unit 220 according to one embodiment of the invention may perform a settlement with reference to the determined reward for the transaction for the content.

For example, when a content is traded on a marketplace, at least a part of a reward for a transaction for the content may be delivered to a seller's account (or wallet).

In this way, transactions between users may be facilitated and a decentralized token economy may be implemented by causing the acquired content to interwork with a plurality of metaverse platforms on the basis of a transaction for the content according to one embodiment of the invention, and causing revenue to be generated for the users with reference to a reward for the transaction for the content.

Next, the communication unit 230 according to one embodiment of the invention may function to enable data transmission/reception from/to the content acquisition unit 210 and the content management unit 220.

Lastly, the control unit 240 according to one embodiment of the invention may function to control data flow among the content acquisition unit 210, the content management unit 220, and the communication unit 230. That is, the control unit 240 according to one embodiment of the invention may control data flow into/out of the service provision system 200 or data flow among the respective components of the service provision system 200, such that the content acquisition unit 210, the content management unit 220, and the communication unit 230 may carry out their particular functions, respectively.

Figure 3:
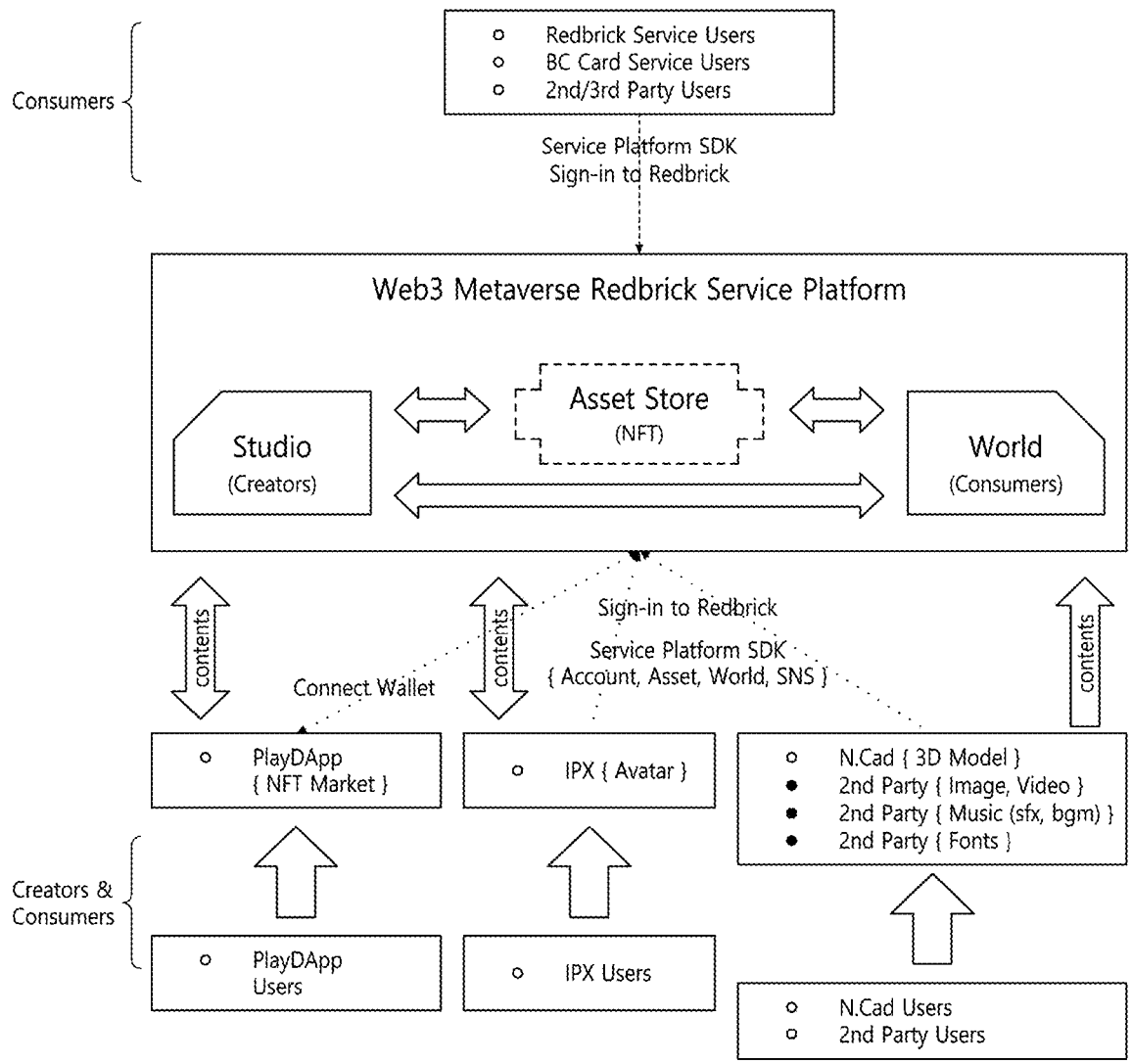
FIG. 3 illustratively shows flows of an open metaverse service according to one embodiment of the invention.

FIG. 3 illustratively shows flows of an open metaverse service according to one embodiment of the invention.

Referring to FIG. 3, the service provision system 200 according to one embodiment of the invention may interwork with a plurality of metaverse platforms via a Web 3.0-based API (or SDK).

For example, according to one embodiment of the invention, data interworking with the plurality of metaverse platforms may be acquired. Specifically, when data on a first avatar generated by users on an IPX platform according to one embodiment of the invention is acquired, data on a second avatar corresponding to the first avatar may be generated with reference to the acquired data on the first avatar. Then, the data on the second avatar may be provided to users of other metaverse platforms via a PlayDApp store according to one embodiment of the invention.

Further, according to one embodiment of the invention, when data on a first created game (e.g., created by Studio) is acquired, data on a second game corresponding to the first game may be generated with reference to the acquired data on the first game. Then, the data on the second game may be provided to users of a metaverse platform (e.g., World) according to one embodiment of the invention.

Furthermore, according to one embodiment of the invention, the service provision system 200 may provide a user interface or user experience for supporting content creation. For example, a content interworking with a metaverse platform may be generated or produced using various modules (e.g., 3D models, images, videos, music, and fonts) and various contents (e.g., contents associated with commerce, education, global IP, gaming, entertainment, and sports) acquired from a second party or N.Cad and provided via the user interface or user experience by the service provision system 200.

Additionally, according to one embodiment of the invention, a marketplace (i.e., Asset Store) interworking with at least one metaverse platform may interwork with a bank (or wallets or accounts) for managing deposits, withdrawals, and payment history of open metaverse service users on the basis of a payment system of a financial company and a NFT payment system based on Web 3.0.

Moreover, according to one embodiment of the invention, the service provision system 200 may proceed with issuance of a NFT for a content (e.g., fashion, character, avatar, or game) created or acquired in the marketplace (i.e., Asset Store) in response to collecting fees from the wallets of the open metaverse service users. Then, the service provision system 200 may support the acquired content to interwork with a plurality of metaverse platforms on the basis of a transaction for the issued NFT according to one embodiment of the invention.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM), and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for providing an open metaverse service interworking with a plurality of metaverse platforms, the system comprising one or more processors and method comprising the steps of:

by the one or more processors, acquiring a content interworking with at least one metaverse platform, the content being generated through a user interface (UI) or user experience (UX) for supporting content creation;

by the one or more processors, supporting issuance of a non-fungible token (NFT) for the acquired content, and supporting a transaction for the issued NFT in a marketplace interworking with the at least one metaverse platform; and by the one or more processors, determining a reward for the transaction for the issued NFT with reference to information on an NET asset value analyzed with reference to at least one of propensity of open metaverse service users, NFT transaction status, and market trends, wherein in the step of acquiring the content, a first content interworking with a first metaverse platform is acquired, wherein in the step of supporting the transaction for the issued NFT, a second content interworking with a second metaverse platform is generated with reference to the first content, and the second content is provided for a user of the second metaverse platform, wherein at least a part of a first user experience (UX) for the first content corresponds to at least a part of a second user experience (UX) for the second content, wherein the method further comprises:

by the one or more processors, updating the first content; and by the one or more processors, updating the second content in real time in response to the first content being updated, and wherein the first content and the second content include at least one of an avatar associated with the at least one metaverse platform, a game associated with the at least one metaverse platform, a program associated with the at least one metaverse platform, and a creative work associated with the at least one metaverse platform such that in response to at least one of the avatar, the game, the program, and the creative work of the first content being updated, at least one of the avatar, the game, the program, and the creative work of the second content is automatically updated in real time.

2. The method of claim 1, wherein in the step of supporting the transaction for the issued NFT, the acquired content is supported to interwork with a plurality of metaverse platforms on the basis of the transaction for the issued NFT.

3. A non-transitory computer-readable recording medium having stored thereon a computer program for causing one or more processors of a system for providing an open metaverse service interworking with a plurality of metaverse platforms to:

acquire a content interworking with at least one metaverse platform, the content being generated through a user interface (UI) or user experience (UX) for supporting content creation;

support issuance of a non-fungible token (NFT) for the acquired content, and support a transaction for the issued NFT in a marketplace interworking with the at least one metaverse platform; and determine a reward for the transaction for the issued NFT with reference to information on an NET asset value analyzed with reference to at least one of propensity of open metaverse service users, NFT transaction status, and market trends, wherein in acquiring the content, a first content interworking with a first metaverse platform is acquired, wherein in supporting the transaction for the issued NFT, a second content interworking with a second metaverse platform is generated with reference to the first content, and the second content is provided for a user of the second metaverse platform, wherein at least a part of a first user experience (UX) for the first content corresponds to at least a part of a second user experience (UX) for the second content, wherein the computer program causes the one or more processors of the system to:

update the first content; and update the second content in real time in response to the first content being updated, and wherein the first content and the second content include at least one of an avatar associated with the at least one metaverse platform, a game associated with the at least one metaverse platform, a program associated with the at least one metaverse platform, and a creative work associated with the at least one metaverse platform such that in response to at least one of the avatar, the game, the program, and the creative work of the first content being updated, at least one of the avatar, the game, the program, and the creative work of the second content is automatically updated in real time.

4. A system for providing an open metaverse service interworking with a plurality of metaverse platforms, the system comprising one or more processors configured to:

acquire a content interworking with at least one metaverse platform, the content being generated through a user interface (UI) or user experience (UX) for supporting content creation;

support issuance of a non-fungible token (NFT) for the acquired content, and support a transaction for the issued NFT in a marketplace interworking with the at least one metaverse platform; and determine a reward for the transaction for the issued NFT with reference to information on an NFT asset value analyzed with reference to at least one of propensity of open metaverse service users, NFT transaction status, and market trends, wherein the one or more processors are configured to acquire a first content interworking with a first metaverse platform, wherein the one or more processors are configured to generate a second content interworking with a second metaverse platform with reference to the first content, and provide the second content for a user of the second metaverse platform, wherein at least a part of a first user experience (UX) for the first content corresponds to at least a part of a second user experience (UX) for the second content, wherein the one or more processors are configured to:

update the first content; and update the second content in real time in response to the first content being updated, and wherein the first content and the second content include at least one of an avatar associated with the at least one metaverse platform, a game associated with the at least one metaverse platform, a program associated with the at least one metaverse platform, and a creative work associated with the at least one metaverse platform such that in response to at least one of the avatar, the game, the program, and the creative work of the first content being updated, at least one of the avatar, the game, the program, and the creative work of the second content is automatically updated in real time.

5. The system of claim 4, wherein the one or more processors are configured to support the acquired content to interwork with a plurality of metaverse platforms on the basis of the transaction for the issued NFT.

\* \* \* \* \*